US009745153B2

(12) United States Patent
Pelzer et al.

(10) Patent No.: US 9,745,153 B2
(45) Date of Patent: Aug. 29, 2017

(54) TRUCK BED EXTENDER WITH PIVOTING RAMPS

(71) Applicants: Matthew Pelzer, Redfield, IA (US); David M. Pelzer, Redfield, IA (US)

(72) Inventors: Matthew Pelzer, Redfield, IA (US); David M. Pelzer, Redfield, IA (US)

(*) Notice: Subject to any disclaimer, the term of this patent is extended or adjusted under 35 U.S.C. 154(b) by 0 days.

(21) Appl. No.: 14/962,914

(22) Filed: Dec. 8, 2015

(65) Prior Publication Data

US 2016/0297343 A1  Oct. 13, 2016

Related U.S. Application Data

(60) Provisional application No. 62/145,102, filed on Apr. 9, 2015.

(51) Int. Cl.
| B60P 1/43 | (2006.01) |
| B60P 3/06 | (2006.01) |
| B65G 69/30 | (2006.01) |
| B60P 3/07 | (2006.01) |
| B60P 3/12 | (2006.01) |
| B60P 3/40 | (2006.01) |
| B60D 1/58 | (2006.01) |

(52) U.S. Cl.
CPC .......... B65G 69/30 (2013.01); B60D 1/58 (2013.01); B60P 1/43 (2013.01); B60P 1/438 (2013.01); B60P 3/07 (2013.01); B60P 3/122 (2013.01); B60P 3/40 (2013.01)

(58) Field of Classification Search
CPC .............. B60P 1/43; B60P 1/438; B60P 3/06
See application file for complete search history.

(56) References Cited

U.S. PATENT DOCUMENTS

| 4,607,996 A | * | 8/1986 | Koch | A01B 73/005 14/71.1 |
| 4,813,841 A | * | 3/1989 | Eischen | B60P 3/06 298/12 |
| 5,362,195 A | * | 11/1994 | Wagner | B60P 3/122 280/789 |
| 5,451,088 A | * | 9/1995 | Broad | B60R 9/06 224/405 |
| 5,533,771 A | * | 7/1996 | Taylor | B60P 1/435 414/537 |
| 5,536,058 A | | 7/1996 | Otis | |
| 5,649,732 A | * | 7/1997 | Jordan | B60P 1/43 296/26.1 |

(Continued)

FOREIGN PATENT DOCUMENTS

CA  2441358  8/2006

*Primary Examiner* — James Keenan
(74) *Attorney, Agent, or Firm* — McKee, Voorhees & Sease, PLC

(57) ABSTRACT

A truck bed extender and ramp assembly mounts to the hitch receiver of a pickup truck to allow four-wheeled vehicles to be driven into and out of the truck bed, with the rear wheels of the vehicle being supported by a crossbar spaced rearwardly from the open tailgate of the truck. The assembly includes ramps pivotally mounted to the crossbar for movement between a lowered use position for loading and unloading the vehicle and a raised transport position. The ramps automatically pivot on the crossbar when the rear wheels of the vehicle pass over the crossbar. The ramps include telescoping sections to adjust the length of the ramps.

19 Claims, 8 Drawing Sheets

(56) References Cited

U.S. PATENT DOCUMENTS

| | | | | |
|---|---|---|---|---|
| 5,688,099 A * | 11/1997 | Fischer | | B60P 3/06 414/537 |
| 5,899,466 A * | 5/1999 | Twaits, Jr. | | B60P 1/43 414/537 |
| 6,076,215 A * | 6/2000 | Blankenship | | B60P 1/43 14/69.5 |
| 6,139,247 A * | 10/2000 | Wright | | B60R 9/06 224/519 |
| 6,241,450 B1 * | 6/2001 | Gehman | | B60P 3/07 414/469 |
| 6,250,874 B1 * | 6/2001 | Cross | | B60P 1/43 296/61 |
| 6,296,290 B1 * | 10/2001 | Wolf | | B60P 1/43 224/521 |
| 6,485,246 B1 * | 11/2002 | Harkcom | | A01B 73/005 410/3 |
| 6,533,337 B1 * | 3/2003 | Harshman | | B60P 1/43 224/403 |
| 6,536,822 B1 | 3/2003 | Vagedes et al. | | |
| 6,685,421 B1 * | 2/2004 | Reeves | | B60P 1/4407 224/519 |
| 6,769,583 B1 * | 8/2004 | Gordon | | B60R 9/06 224/402 |
| 7,070,220 B1 | 7/2006 | Lantaigne | | |
| 7,243,966 B1 * | 7/2007 | Sheldon | | B60P 3/40 224/519 |
| 7,381,019 B1 * | 6/2008 | Boice | | B60P 3/07 410/3 |
| 7,549,692 B2 | 6/2009 | Washington | | |
| 8,051,519 B1 * | 11/2011 | Adams | | B60P 1/43 14/69.5 |
| 8,061,754 B1 | 11/2011 | Webb | | |
| 8,177,276 B2 * | 5/2012 | Edwards | | B60P 3/07 224/405 |
| 8,292,565 B1 * | 10/2012 | Ruff | | B60P 1/43 14/71.1 |
| 8,561,238 B1 * | 10/2013 | Inget | | B60P 1/43 14/71.1 |
| 8,668,427 B1 * | 3/2014 | England | | B60P 1/43 414/537 |
| 8,882,436 B2 * | 11/2014 | Kramlick | | B60P 3/07 414/477 |
| 8,894,345 B1 * | 11/2014 | Richins | | B60P 1/435 414/537 |
| 9,085,258 B2 * | 7/2015 | Patterson | | B60P 1/435 |
| 2004/0232185 A1 * | 11/2004 | Darby | | B60R 9/06 224/521 |
| 2005/0263555 A1 * | 12/2005 | Hail | | B60P 3/40 224/402 |
| 2012/0009050 A1 | 1/2012 | Pepin | | |
| 2013/0045069 A1 * | 2/2013 | Day | | B60P 1/43 414/537 |
| 2013/0175820 A1 | 7/2013 | Lepage | | |
| 2013/0343847 A1 * | 12/2013 | Freeman | | B60P 1/436 414/523 |
| 2014/0338137 A1 * | 11/2014 | Stokes | | B60D 1/06 14/71.1 |

* cited by examiner

TRUCK BED EXTENDER WITH PIVOTING RAMPS

CROSS-REFERENCE TO RELATED APPLICATIONS

This Application claims priority to Provisional Application U.S. Ser. No. 62/145,102 filed on Apr. 9, 2015, which is herein incorporated by reference in its entirety.

BACKGROUND OF THE INVENTION

Pickup truck beds typically are 5-8 feet long. Some trucks include a box for tools or other objects extending across the front of the truck bed, which effectively shortens the length of the bed. It is sometimes desirable to transport objects in the bed which are longer than the bed, and extend beyond the tailgate, even when the tailgate is down. For example, the owner of a four wheeled ATV or golf cart may wish to haul the ATV or golf cart in the truck bed, but the wheel base is too long for the bed.

One option for transporting an ATV or golf cart, or other lengthy objects, is the use of a trailer pulled behind the truck. However, a trailer requires additional driving skills, and has its own costs and licensing requirements and fees.

Another alternative for hauling ATVs, golf carts, and the like is the use of a truck bed extender which typically mounts to the hitch receiver of the truck. The extender includes a bridging platform between the lowered truck tailgate and a load bearing beam normally positioned in the same plane as the lowered tailgate. Conventional truck bed extenders include separate ramps which must be loaded and unloaded in the truck bed so that the ATV or golf cart can be driven to and from the truck bed, which is inconvenient and time consuming.

Therefore, a primary objective of the present invention is the provision of an improved truck bed extender and ramp assembly.

A further objective of the present invention is the provision of a truck bed extender having ramps which pivot between an inclined used position and a raised transport position.

Another objective of the present invention is the provision of a pickup truck bed extender having ramps which automatically pivot when an ATV or golf cart is driven onto and off of the truck bed.

Still another objective of the present invention is the provision of a truck bed extender having ramps which do not need to be removed when the truck is driven.

Yet another objective of the present invention is the provision of a truck bed extender having telescoping ramps attached thereto.

A further objective of the present invention is the provision of a truck bed extender having ramps which pivot between loading/unloading and transport positions merely by the weight of an ATV or golf cart moving along the ramps.

Another objective of the present invention is the provision of a truck bed extender which mounts to the hitch receiver of a pickup truck to extend the bed of the truck for hauling elongated objects which extend beyond the open tailgate of the truck.

A further objective of the present invention is the provision of a ramp assembly for a pickup truck having brake lights electrically coupled to the truck's braking system.

Still another objective of the present invention is the provision of a truck bed extender and ramp assembly which is adjustable to accommodate various truck models.

Another objective of the present invention is the provision of a truck bed extender with ramps, wherein the assembly is economical to manufacture, and durable, safe, and simple to use.

These and other objectives will become apparent from the following description of the invention.

SUMMARY OF THE INVENTION

A truck bed extender and ramp assembly includes a tongue adapted to be mounted in the hitch receiver of a pickup truck and extending rearwardly beyond an open tailgate of the truck. A crossbar is pivotally mounted adjacent the rearward end of the tongue. A pair of ramps are pivotally mounted on the crossbar between opposite forward and rearward ends to as to be pivotal between a loading/unloading use position and a raised transport position. In the lowered use position, an ATV or golf cart can be driven up and down the ramps for loading into and unloading from the truck bed. The ramps automatically pivot about the crossbar when the rear wheels of the ATV or golf cart pass over the crossbar in both the loading and unloading directions. The ramps remain on the crossbar when the truck is driven, and include telescoping sections so as to shorten the overall length of the ramps during transportation. Brake lights can be provided on the assembly and electrically coupled to the truck's brake system. The crossbar is adjustably mounted on the tongue so that the position between the tailgate and the crossbar can be increased or decreased, as needed on different truck models.

DETAILED DESCRIPTION OF THE INVENTION

Figure 8:
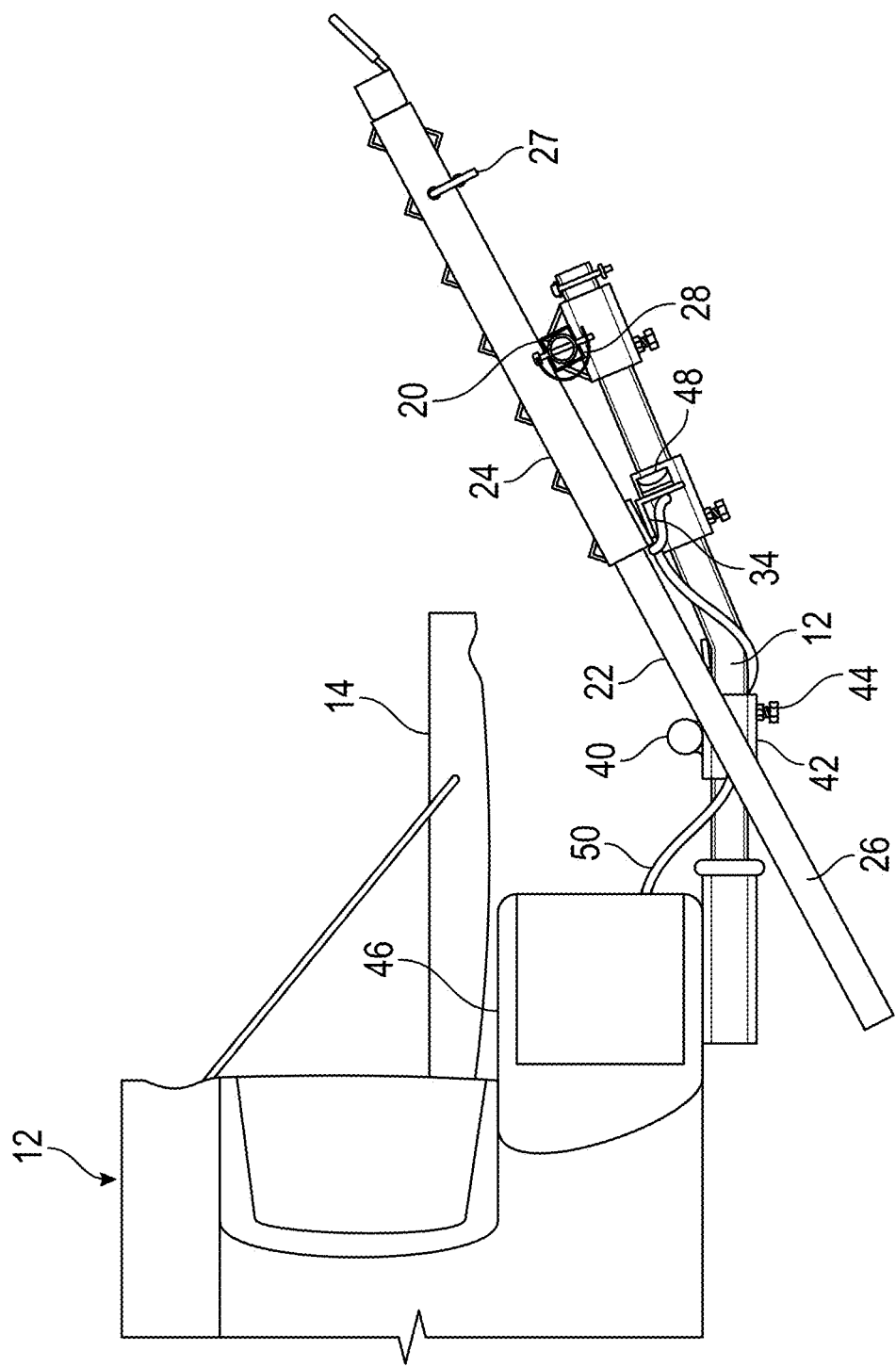
FIG. 8 is a side elevation view of the assembly mounted on to the pickup truck.

The pickup truck bed extender and ramp assembly 10 of the present invention is intended for use with a pickup truck 12 having a tailgate 14 which is movable between a raised closed position and a lowered open position. The assembly 10 includes a bar or tongue 16 mountable in the hitch receiver so as to extend rearwardly behind the truck. A cross bar or arm 20 is mounted on the rear end of the tongue 16 and extends laterally at a position spaced rearwardly from the rear edge of the open tailgate 14 of the truck 12. As seen in FIG. 8, the rearward end of the tongue is preferably inclined upwardly to support the cross bar 24.

A pair of ramps 22 are pivotally mounted on the cross bar 20 for movement between a lowered, inclined use position for loading and unloading an ATV 52 or a golf cart (not shown) and a raised transport position. Each ramp has telescoping sections 24, 26. A spring loaded lock pin 27 (FIG. 7), extends through a hole in the ramp section 24 and one or more holes (not shown) in the ramp section 26 to lock the ramp sections together, such as when the ramps 22 are in the transport position or otherwise not in use.

Figure 1:
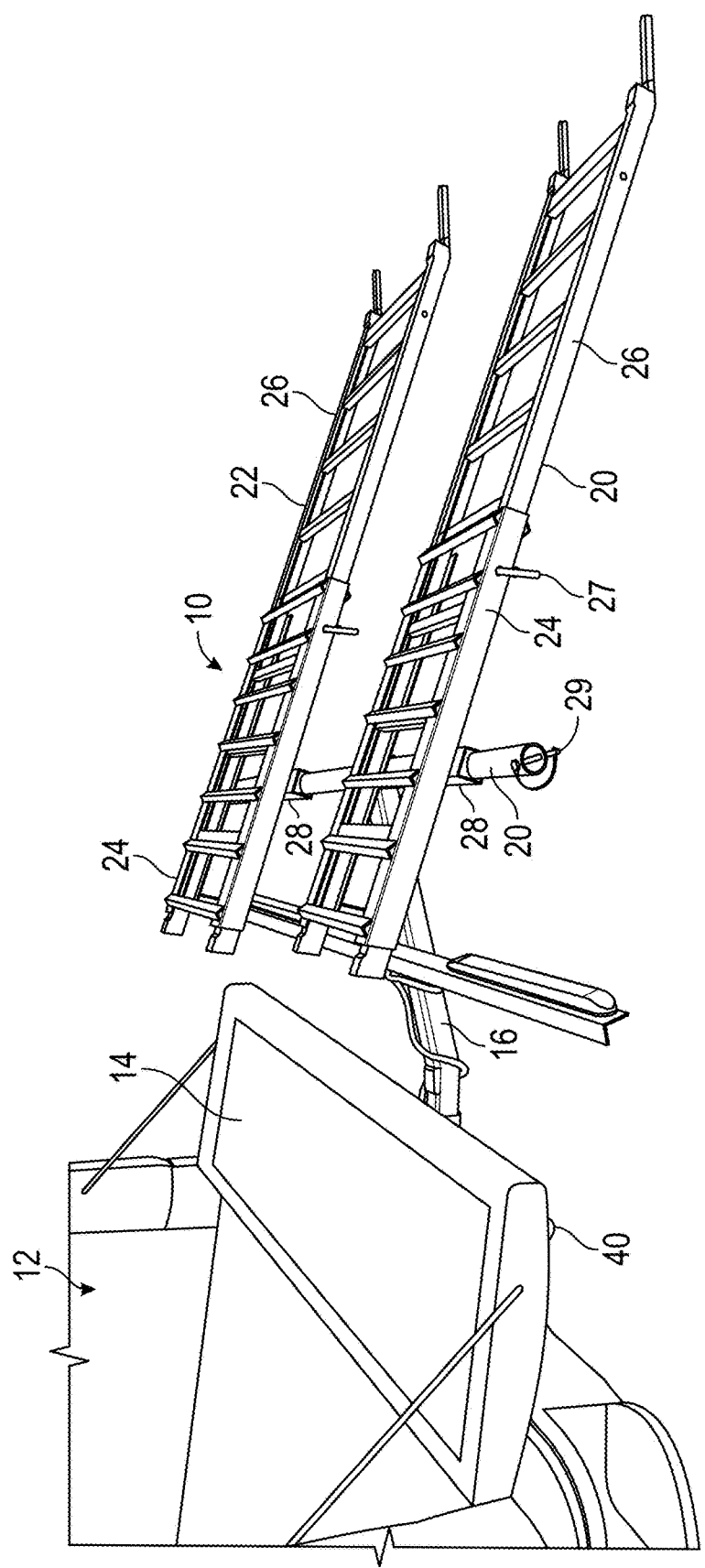
FIG. 1 is a perspective view of the truck bed extender and ramp assembly of the present invention, with the ramps lowered into the loading/unloading position and the truck tailgate down.
Figure 2:
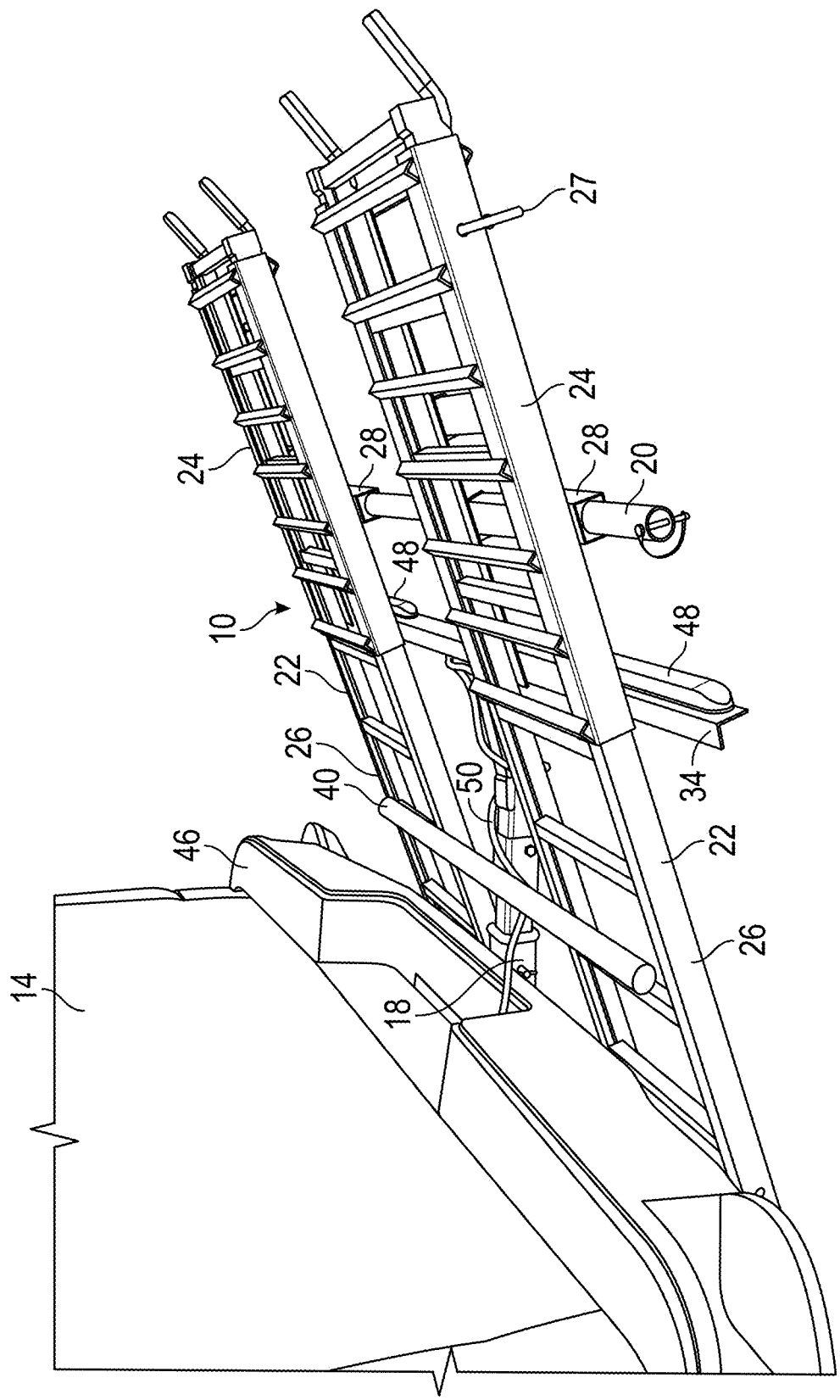
FIG. 2 is a perspective view of the assembly with the ramps raised and pivoted to a transport position with the tailgate up.
Figure 3:
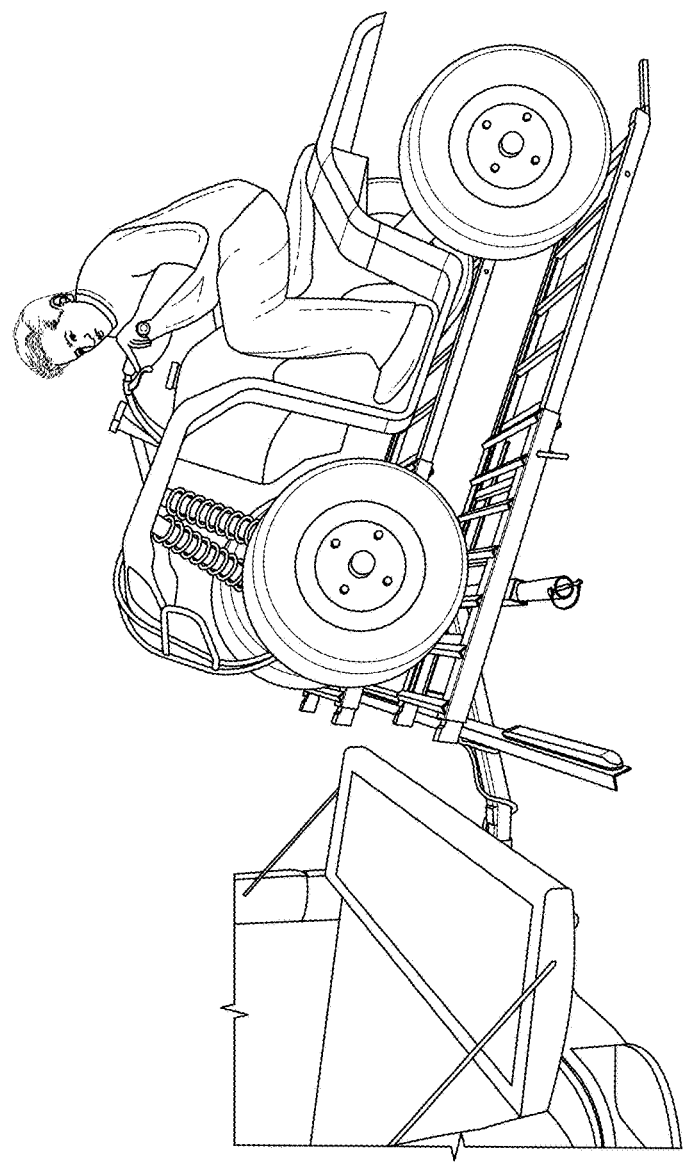
FIG. 3 is a perspective view showing the truck bed extender and ramp assembly with an ATV near the bottom of the ramps.
Figure 4:
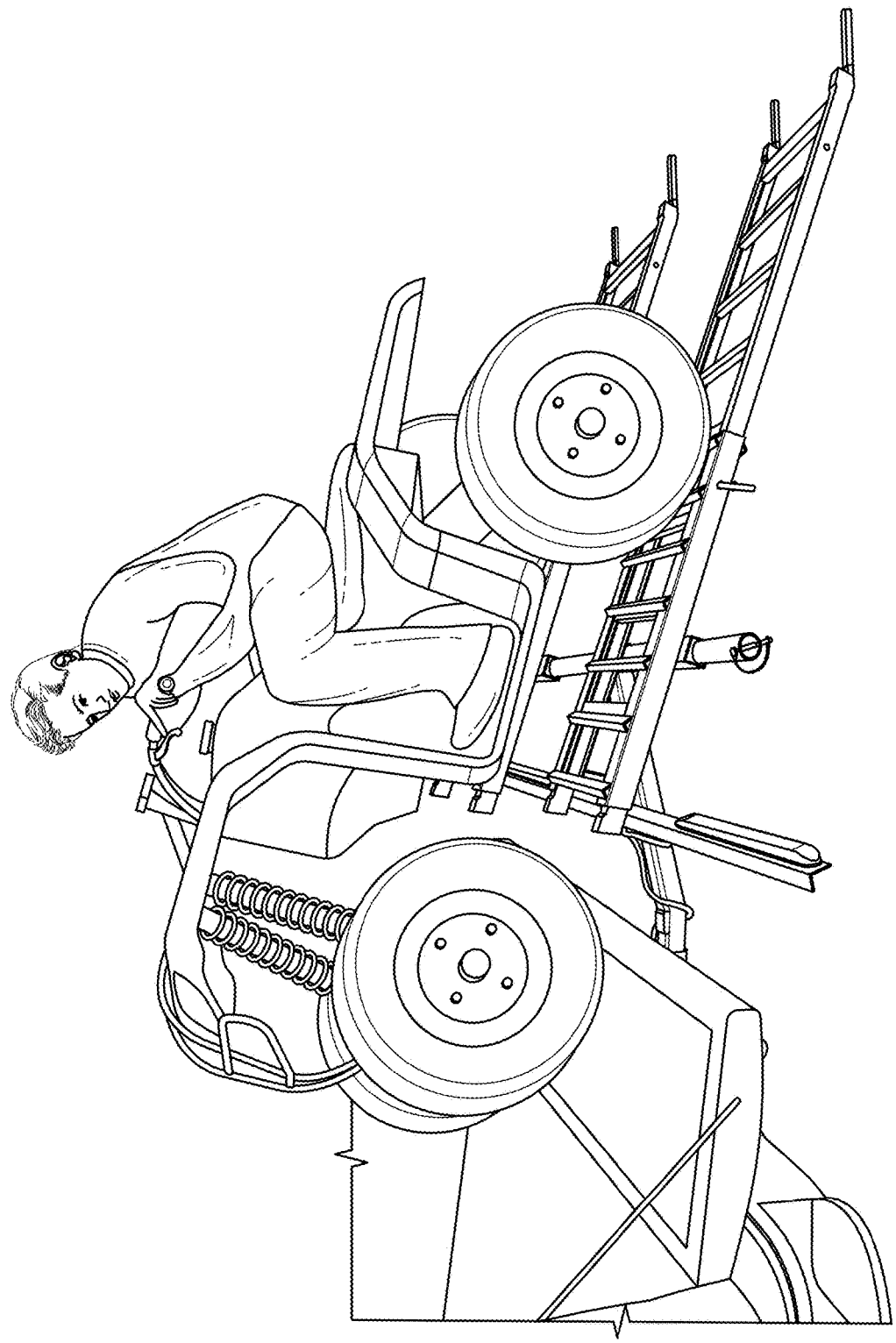
FIG. 4 is a view similar to FIG. 3 with the ATV at an intermediate position along the ramps.
Figure 7:
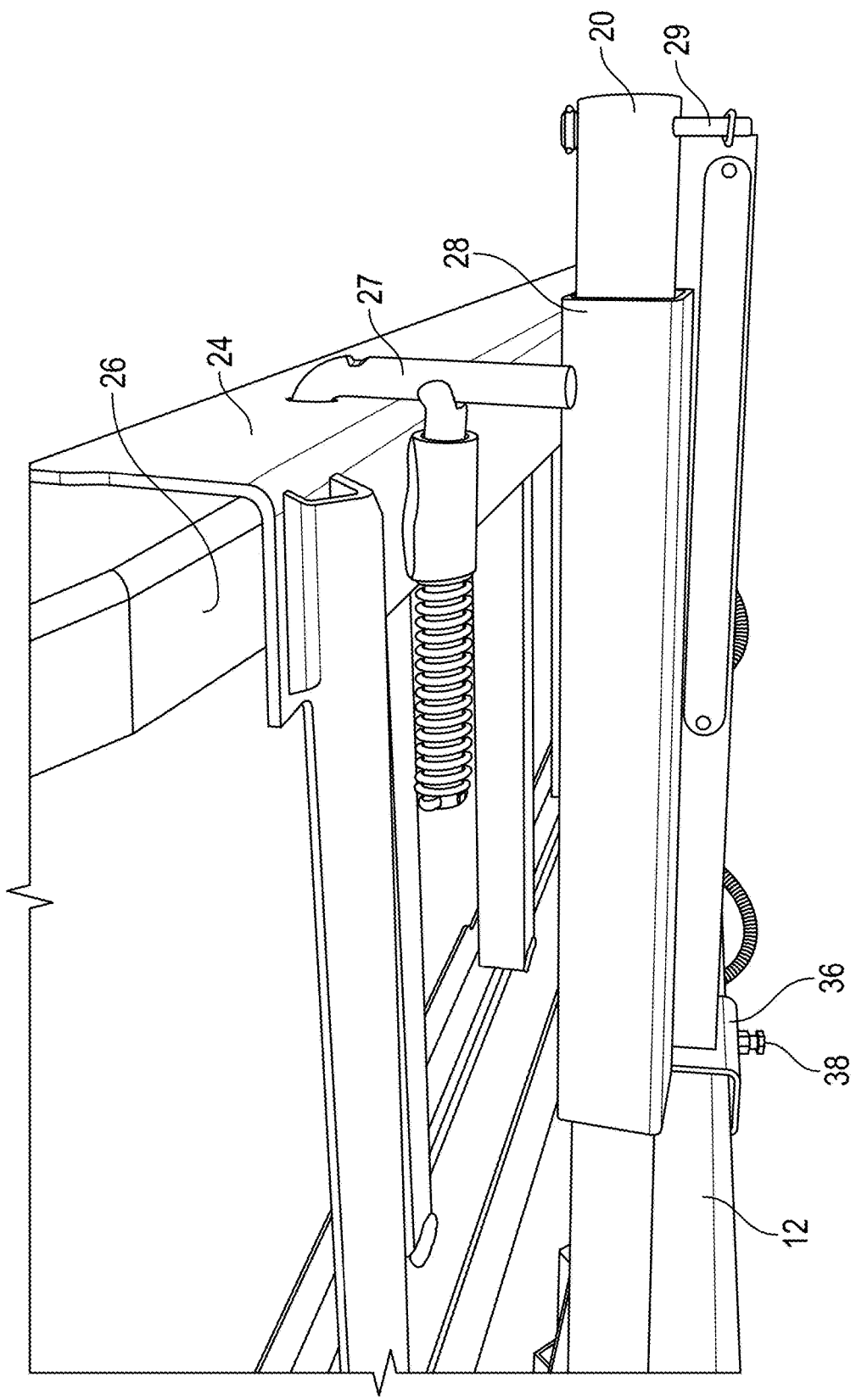
FIG. 7 is a lower perspective view showing one of the ramp lock pins of the assembly.

As best seen in FIG. 7, each ramp 22 has a tube 28 which slidably and rotatably fits over the bar 20 and is retained in any convenient manner, such as a pin 29. The tube 28 can be square or round. As is shown in FIGS. 1, 3 and 4, the forward ends of the ramps 22 extend forwardly from the cross bar 20, and are spaced rearwardly from the rear edge of the opened tailgate 14 when the ramps are in the loading/unloading position. Also, as seen in FIG. 8, the height of the cross bar 20 is at an elevation lower than the horizontal plane of the opened tailgate 14.

The cross car 20 is slidably mounted on the tongue 16 using a tubular collar 28 fixed in a desired position along the tongue 16 by one or more set bolts 32. A secondary cross bar or arm 34 may be provided on the tongue 16 to limit the rotation of the ramps 26 on the cross bar 20. The cross bar 34 may be adjustably mounted on the tongue 16 via a tubular collar 36 with one or more set bolts 38 which can be tightened to hold the cross bar 34 in a selected position along the tongue 16.

Another cross bar or arm 40 may be provided on the tongue 16 and slidably positioned via a collar 42 with one or more set bolts 44 so as to be positioned adjacent and below the rear bumper 46 of the truck 12. The cross bar 40 protects the truck bumper 46 from being hit by the ramps 26, such as when the telescoping ramp sections 26 are retracted to the transport position.

The assembly may be provided with brake lights on one of the cross bars 20, 34 or 40. The lights are preferably electrically coupled to the brake system of the truck via a wiring harness 50. As an alternative or in addition to the brake lights, the assembly can have reflectors strategically placed to increase visibility of the assembly 10 after dark to a vehicle following the truck 12.

Figure 5:
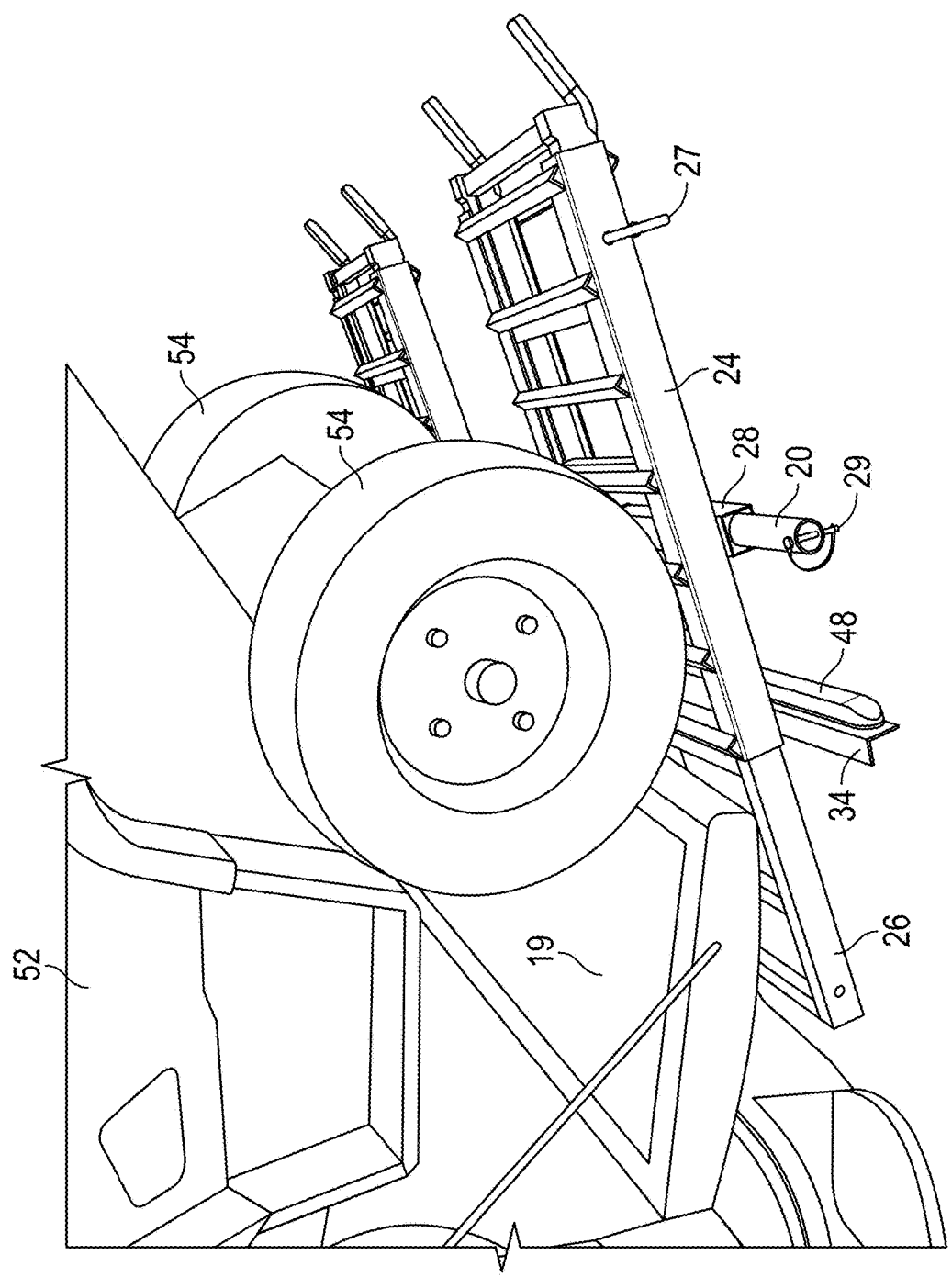
FIG. 5 is a view similar to FIG. 3 with the ATV loaded into the truck bed with the rear wheels supported by the assembly.
Figure 6:
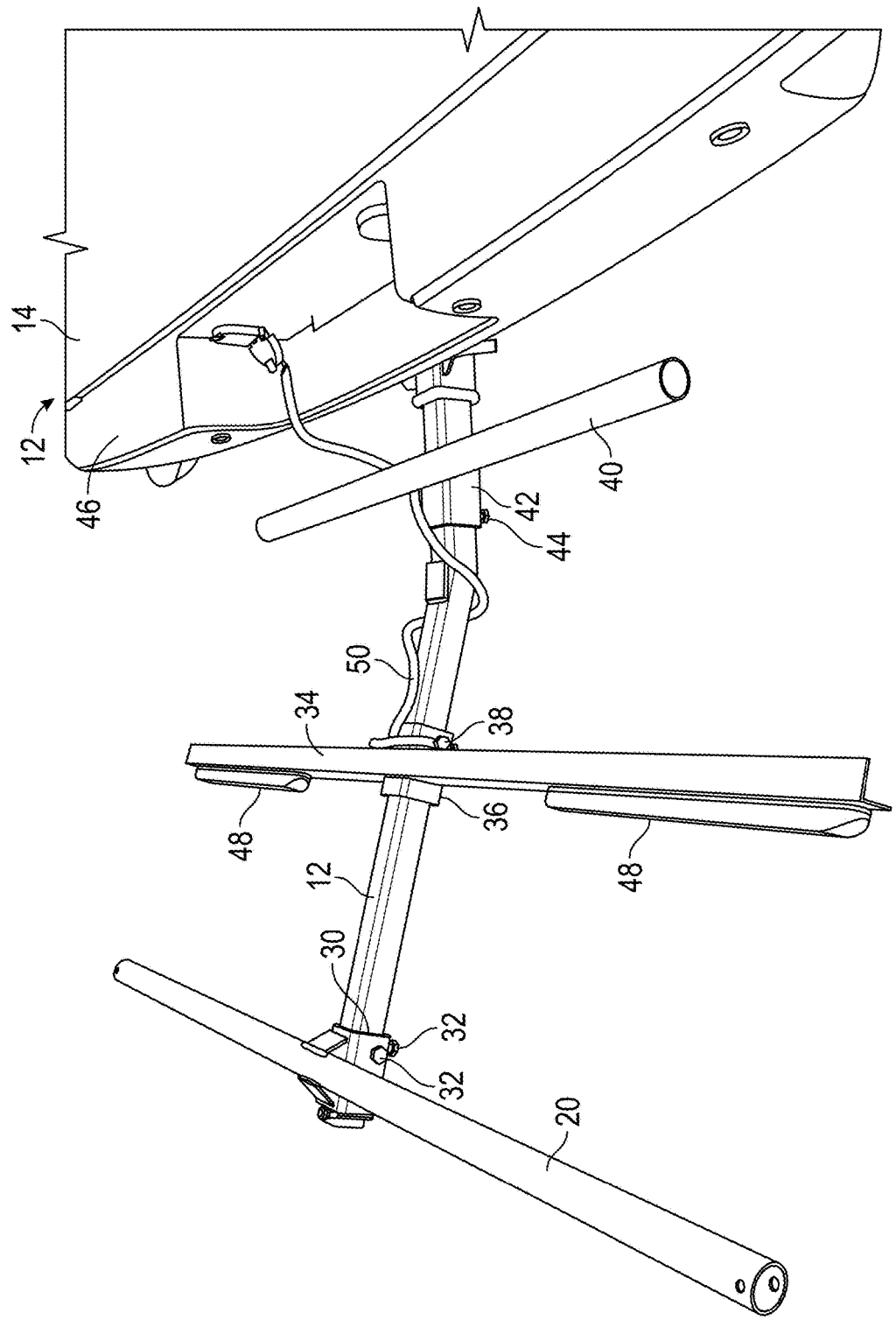
FIG. 6 is a view of the frame of the assembly, with the ramps removed for clarity.

In use, to load an ATV 52 or golf cart into the truck bed, the tongue 12 is pinned into the hitch receiver 18 of the truck, and the ramps 22 are telescoped outwardly and positioned with the rear ends on the ground. The lateral spacing between the ramps 22 is adjusted on the bar 20 to align with the wheels of the ATV 52 or golf cart. The ATV 52 or cart is then driven upwardly on the inclined ramps 22 and forwardly into the truck bed. As the forward movement of the ATV or golf cart continues, the rear wheels 54 pass over the cross bar 20 such that the weight of the vehicle or cart 52 automatically pivots the ramps 22 about the cross bar 20. The distance between the rear of the tailgate 14 and the cross bar 20 is less than the diameter of the ATV 52 or golf cart wheels 54, such that the rear wheels 54 will nest or cradle on the tailgate 14 and ramps 22, as seen in FIG. 5. Then, the telescoping rear ends 26 of the ramps 22 can be retracted and fixed by the lock pins 27 for transport, without removing the ramps from the cross bar.

To unload the ATV 52 or golf cart from the truck bed, the process is reversed. The telescoping ramp sections 26 are extended, and then the ATV 52 or golf cart is driven rearwardly from the truck bed. As the rear wheels 54 pass over the post 20, the ramps 22 automatically pivot downwardly into engagement with the ground. As seen in FIG. 1, the forward ends of the ramps 26 are adjacent the rearward end of the tailgate 14 when the ramps are in the downwardly inclined, use or loading/unloading position.

The invention has been shown and described above with the preferred embodiments, and it is understood that many modifications, substitutions, and additions may be made which are within the intended spirit and scope of the invention. From the foregoing, it can be seen that the present invention accomplishes at least all of its stated objectives.

From the foregoing, it can be seen that the present invention accomplishes at least all of the stated objectives.

What is claimed is:

1. A ramp assembly for use with a pickup truck having a bed, a tailgate movable between open and closed positions, and a hitch receiver, comprising:
    a tongue having opposite front and rear ends, and the front end being adapted to mount in the hitch receiver;
    a first cross bar adjacent the rear end of the tongue;
    a pair of ramps each having opposite forward and rearward ends and being pivotally mounted on the cross bar between the opposite ramp ends whereby the ramps pivot from a use position with the rear ends on the ground and the forward ends at an elevation substantially level with the tailgate and spaced from the tailgate for rolling an object into and out of the truck bed with the tailgate open without lifting the object and a transport position with the rear ends raised off the ground, and
    wherein the ramps automatically pivot between the use and transport positions when the object is rolled up and down the ramps into and out of the truck bed, without spring bias.

2. The ramp assembly of claim 1 wherein the ramps have telescoping sections.

3. The ramp assembly of claim 1 wherein the ramps are adapted to pivot when the rear wheels of the vehicle pass over the first cross bar.

4. The ramp assembly of claim 1 further comprising a second cross bar on the tongue forwardly of the first cross bar.

5. The ramp assembly of claim 1 wherein the first cross bar is adjustably mounted on the tongue.

6. The ramp assembly of claim 1 wherein the rear end of the tongue is inclined upwardly.

7. The ramp assembly of claim 1 further comprising brake lights electrically coupled to the truck.

8. The ramp assembly of claim 1 wherein the ramps are inclined upward from the rear ends in the use position and inclined downwardly from the rear ends in the transport position.

9. The ramp assembly of claim 1 wherein the forward ends of the ramps are below the truck bed in the transport position.

10. A method of loading and unloading a 4-wheeled vehicle having front and rear wheels to and from a pickup truck bed having an open tailgate, comprising:
    mounting a ramp assembly to a hitch receiver on the truck, the ramp assembly having a pair of ramps with opposite forward and rearward ends;
    pivotally supporting the ramps at a pivot point between the ends at a location behind the tailgate for movement between an inclined use position and a raised transport position;

positioning the ramps in the use position such that the forward ends of the ramp are at an elevation substantially level with the open tailgate and spaced behind the tailgate;

driving the 4-wheeled vehicle up the ramps into the truck bed wherein the vehicle weight automatically pivots the ramps to the transport position after the rear wheels pass the pivot point;

driving the 4-wheeled vehicle down the ramps out of the truck bed whereby the weight of the vehicle automatically pivots the ramps to the use position after the rear wheels pass the pivot point; and the forward and rearward ends of each ramp pivoting in unison between the use and transport positions.

11. The method of claim 10 wherein the rear ends of the ramps are on the ground in the use position and off the ground in the transport position.

12. The method of claim 10 wherein the rear wheels of the vehicle rest upon the tailgate and the ramps when the vehicle is loaded.

13. The method of claim 10 further comprising telescoping sections of the ramps between the use and transport positions.

14. The method of claim 10 further comprising electrically coupling brake lights on the ramp assembly to the truck.

15. A ramp assembly for use with a pickup truck having a bed and a hitch receiver, comprising:

a tongue having opposite front and rear ends, and the front end being adapted to mount in the hitch receiver;

a first cross bar adjacent the rear end of the tongue;

a pair of ramps each having opposite forward and rearward ends and being pivotally mounted on the cross bar between the opposite ramp ends whereby the ramps pivot from a use position with the rear ends on the wound and the forward ends at an elevation substantially level with the bed and spaced from the bed for rolling an object into and out of the bed without lifting the object and a transport position with the rear ends raised off the ground; and wherein the ramps automatically pivot without spring bias between the use and transport positions when the object is rolled up and down the ramps into and out of the truck bed.

16. The ramp assembly of claim 15 wherein the ramps have telescoping sections.

17. The ramp assembly of claim 15 wherein the ramps are adapted to pivot when the rear wheels of the vehicle pass over the first cross bar.

18. The ramp assembly of claim 15 further comprising a second cross bar on the tongue forwardly of the first cross bar.

19. The ramp assembly of claim 15 wherein the ramps are inclined upward from the rear ends in the use position and inclined downwardly from the rear ends in the transport position.

* * * * *